Aug. 16, 1955  C. W. TASKER  2,715,244
APPARATUS FOR PROCESSING A TRAVELING PELLICLE
Filed July 5, 1952
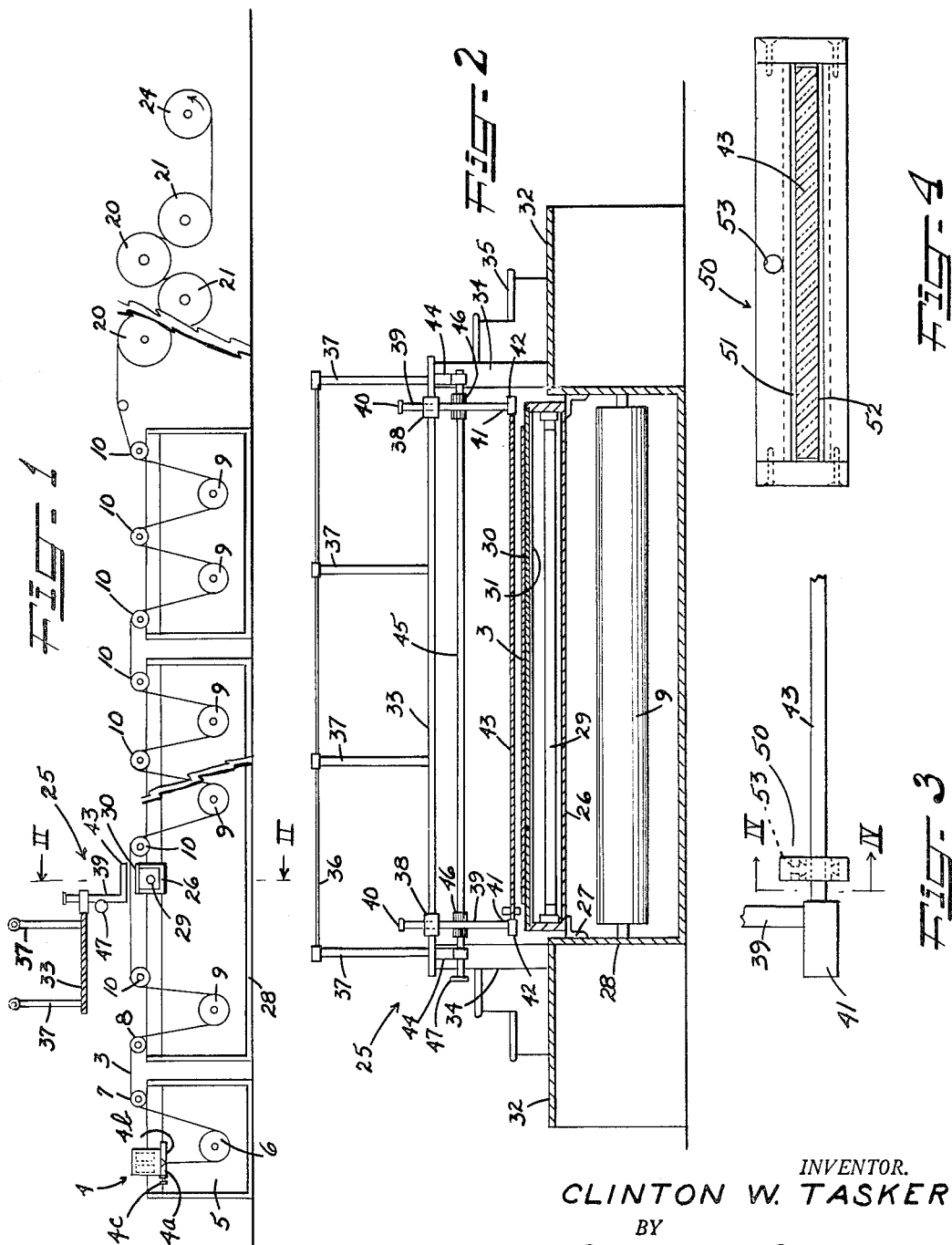
INVENTOR.
CLINTON W. TASKER
BY
Carl A. Castellan
ATTORNEY.

United States Patent Office 2,715,244
Patented Aug. 16, 1955

2,715,244

APPARATUS FOR PROCESSING A TRAVELING PELLICLE

Clinton W. Tasker, Delaware County, Pa., assignor to American Viscose Corporation, Philadelphia, Pa., a corporation of Delaware Application July 5, 1952, Serial No. 297,243

4 Claims. (Cl. 18—1)

The present invention relates to the manufacture of transparent pellicles, films, sheets, webs, and the like from the conventional film-forming compositions and more particularly to apparatus for facilitating the detection of strains and/or other irregularities during the conventional treating and processing operations thereof.

In the manufacture of various types of pellicles, films, sheets, webs, and the like from the conventional film-forming compositions such as viscose for producing regenerated cellulose, the vinyl resins, the organic cellulose esters and ethers, nylon, and other similar materials, the same are ordinarily continuously directed under a predetermined amount of tension from suitable extrusion apparatus through the various subsequent processing stations toward a suitable take-up device. Due to a frequent lack of uniformity in the spacing or separability of the adjustable lips of the extrusion apparatus, the thickness of the extruded film or the like oftentimes varies so that under tension various strains and other similar irregularities are readily formed therein. Although non-uniformity in thickness and therefore in tension across the width of the film may be readily neutralized by suitable adjustment of the lips of the extrusion device once the non-uniformity has been detected, considerable difficulty has been experienced in the past in discovering the presence of the same so that the proper compensatory adjustments might be made.

It is a principal object of the present invention to provide novel and improved apparatus for the manufacture of transparent pellicles, webs, sheets and the like whereby the same may be rapidly and conveniently inspected in a thorough and efficient manner.

It is a further object of the present invention to provide novel and improved apparatus for detecting irregularities in tension across the width of the continuously moving material.

Other objects and advantages of the invention will be apparent from the following description. In the drawing which is illustrative of the present invention, Figure 1 is a diagrammatic elevational view of a preferred embodiment of the present invention;

Figure 2 is a section on reference line II—II in Figure 1;

Figure 3 is an enlarged view of a detail of the present invention shown in Figure 2; and Figure 4 is a section on reference line IV—IV in Figure 3.

In general the improved strain detecting apparatus of the present invention comprises a suitable light source; a polarization device positioned to receive light from the source and convert the same into a beam of plane polarized light; a second polarization device disposed to receive the beam of polarized light, the polarizing axes of the polarization devices being oriented preferably parallel to one another; and means for passing a continuously moving transparent material between the said polarization devices. It has been found that undesirable strains and/or other irregularities in the continuously moving material which have heretofore been hidden to the naked eye may be readily detected with such apparatus.

A preferred embodiment of the spinning and processing apparatus of which the strain detecting device of the present invention is an essential part is shown in Figure 1 of the drawing. As shown therein, the film forming material is directed between the adjustable orifice defining lips 4a and 4b of the extrusion device 4 into the coagulating or regenerating bath 5 where the web or sheet 3 of any suitable material such as cellophane or the like is formed. Thereafter the sheet 3 is conducted about roll 6, over the pair of wiper rolls 7 and 8, successively about the upper and lower guide rolls 9 and 10 which direct the sheet 3 through the various washing, desulphurizing, bleaching, glycerinating and other conventional processing and treating baths, and about the successive upper and lower drying rolls 20 and 21 to the conventional take-up device 24. As the adjusting means 4c for orifice defining lips of the extrusion device may take a great variety of forms and as its details form no part of the present invention, a full description thereof is not deemed expedient. For a detailed disclosure of one such adjusting means, reference may be had to the copending application Serial No. 267,866 to Seddon C. Nelson.

As also shown in Figure 1 of the drawing, the strain detecting device which is generally designated by the reference character 25, is preferably positioned adjacent the extrusion end of the spinning and processing apparatus at a point where the partially treated extruded material has been desulphurized and therefore is sufficiently transparent but where it is still relatively pliant and unstable.

The details of the strain detecting device 25 which is shown positioned between a pair of adjoining upper guide rolls 10 is best shown in Figure 2 of the drawing. As illustrated therein, the enclosed scanning box 26 is disposed on the bracket members 27 across the width of the treating bath 28, preferably as will be explained more fully hereinafter in such a manner that the continuously moving web 3 slidably engages its upper surface and minimizes condensation thereupon. Any suitable source of light such as the fluorescent lamp or the like 29 is positioned inside the box preferably as shown and is energized by any suitable and conventional means not shown on the drawing. As will be explained more fully hereinafter, the contiguous layers or sheets of a suitable light diffusing material such as opal glass 30 and a polarizing medium 31 such as "Polaroid" respectively diffuse and polarize the light which is directed upwardly from the lamp 29 due to the opaque nature of the other walls of the box.

The catwalk or the like 33 which also extends across the width of the bath 28 between opposite sides thereof is supported by the vertically disposed posts or support members 34 and as will be more apparent hereinafter permits a convenient viewing of the continuously moving web as it passes through the strain detecting apparatus of the present invention. The stepped structures 35 are preferably provided between opposite extremities of the catwalk 33 in order to provide ready access thereto, and the bar or cable or the like 36 with its upright post-like support members 37 provides a suitable rail for the convenience of the attendant.

The bearing members 38 which are preferably secured to the edge of the catwalk 33 slidably accommodate the vertically disposed rack members 39 which are shown positioned at opposite ends thereof. The cap portions 40 are preferably affixed to the upper extremity of the rack members 39 to limit the downward movement thereof. The lower extremity of each of the rack members is secured in any suitable fashion such as by welding at 41 to opposite sides of the frame member 42 in which an analyzer such as the sheet of "Polaroid" or other suitable polarizing material 43 is disposed in a manner which will be more fully described hereinafter.

The journal members 44 which are secured to the base of the catwalk 33 and which extend downwardly therefrom rotatably support the horizontally disposed shaft 45. The gears or the like 46 which are affixed to the shaft 45 in any conventional manner are adapted to engage the teeth of the rack members 39 and thereby cause movement of the same in the bearing members 38. The hand wheel or the like 47 which is secured to either or both ends of the shaft 45 provides a convenient means whereby the rack members and therefore the sheet of "Polaroid" or the like attached thereto may be moved in a vertical manner toward or away from the continuously moving web 3.

The frame or the like 50 with its associated wiper members 51 and 52 is preferably provided to facilitate the cleansing operation of opposite surfaces of the "Polaroid" sheet or the like 43. Thought any suitable conventional means for moving the wiper members across the width of the sheet 43 might be used, the frame 50 is preferably apertured and threaded as at 53 to receive the complementary threads of a suitable rod or pole not shown on the drawing. Thus, when it is desired to remove smudges or the like from the "Polaroid" sheet 43, the operator need merely threadedly engage the pole with the frame and move the wiper members back and forth over its opposite surfaces.

Though no particular means for cleansing the upper surface of the lower "Polaroid" sheet 31 is shown due to the continuous wiping action of the continuously moving web 3, it is to be understood that any conventional means could be used for this purpose.

In operation the transparent web 3 which is to be inspected in accordance with the present invention is directed from the extrusion device 4, through the various conventional processing and treating stations and between the opposed sheets of polarizing material 31 and 43, and ultimately to the take-up device 24. The light rays which pass upwardly from the fluorescent lamp 29 through the opal glass diffuser 30 and the "Polaroid" sheet 31 are polarized thereby in a plane which is preferably oriented at an angle of 45° to the direction of movement of the web where it has been found that optimum results may be obtained. The plane of polarization of each of the individual plane polarized light rays in passing through the doubly refractive cellophane sheet or the like 3 is shifted in accordance with the severity as well as the presence or absence of strains and/or other irregularities therein. Thus, when the rays which emerge from the sheet 3 are observed through the upper "Polaroid" sheet or analyzer 43 which is preferably oriented such that its polarizing axis is parallel with that of the lower polarizing sheet 31, the irregularities in the sheet 3 are clearly and readily evidenced by color variations across the width of the same.

Though for cellophane sheets and the like best results ordinarily have been obtained where the polarizing axes of the polarization devices 31 and 43 have been positioned substantially parallel to one another, it is to be understood that any other relative orientation of the said polarizing axes could be employed without departing from the spirit or scope of the present invention.

During the lacing operation of the processing apparatus the operator or attendant merely rotates the hand wheel 47 thereby causing the upper "Polaroid" sheet 43 to move upwardly away from the continuously moving web 3 as it passes between the pair of adjoining upper rolls 10. After the web has been properly laced about the various guide rolls, the "Polaroid" sheet 43 is once again returned to its position adjacent the web. When the web is in a wet and/or moistened condition, the sheet 43 is preferably placed in contact with the web so as to wipe the same and minimize the collection of condensation droplets or the like thereon. For a similar reason the lower "Polaroid" sheet 31 also is preferably positioned such that it engages the web when the same is in a moistened condition.

While preferred embodiments of the invention have been disclosed, the description is intended to be illustrative only and it is to be understood that changes and variations may be made without departing from the spirit and scope of the invention as defined by the appended claims.

I claim:

1. Apparatus for processing a continuously moving transparent material comprising a vat through which the transparent material passes during a liquid treating operation thereof, an enclosed box which extends across the width of the vat beneath the continuously moving transparent material; the top of the box including contiguous sheets of opal and light polarizing material; a source of light energy within the box; a catwalk extending over the vat between opposite sides thereof; a bearing which is secured to the catwalk adjacent each extremity thereof; a vertically disposed rack member slidably positioned in each of the bearings; another light polarizing sheet secured to the lower extremities of the rack members; and means which cooperate with the teeth of the rack members to adjust the vertical disposition of the same.

2. Apparatus for processing a continuously traveling regenerated cellulose pellicle comprising a vat through which the pellicle passes during a liquid-treating operation thereof, an inclosed box which extends across the width of the vat beneath the traveling pellicle, a sheet of light-polarizing material positioned in the top of the box and under the pellicle, a light source in the box, a second sheet of light-polarizing material positioned in alignment with the box and over the pellicle, and means for supporting said second light-polarizing material.

3. Apparatus for processing a continuously traveling regenerated cellulose pellicle comprising a vat through which the pellicle passes during a liquid-treating operation thereof, an inclosed box which extends across the width of the vat beneath the traveling pellicle, a sheet of light-polarizing material positioned in the top of the box and under the pellicle, a light source in the box, a second sheet of light polarizing material positioned in alignment with the box and over the pellicle, means for supporting said second light-polarizing material, and means for adjusting said supports.

4. Apparatus for processing a continuously-traveling transparent pellicle of regenerated cellulose comprising a vat through which the pellicle passes during a liquid-treating operation thereon, a light source extending across the width of the vat beneath the traveling pellicle, at least one sheet of light-polarizing material between the light source and the traveling pellicle, a supporting member extending over the vat between opposite ends thereof, a second sheet of light-polarizing material secured to the supporting member, and means for adjusting the vertical disposition of the second light-polarizing sheet with respect to the pellicle and the light source.

References Cited in the file of this patent

UNITED STATES PATENTS

| | | |
|---|---|---|
| 1,476,102 | Pickard et al. | Dec. 4, 1923 |
| 2,070,787 | Frocht | Feb. 16, 1937 |
| 2,083,557 | Crane et al. | June 15, 1937 |
| 2,332,674 | Smith | Oct. 26, 1943 |

OTHER REFERENCES

Bailey, "Plastics Technology," India Rubber World May 1948.